No. 691,110. Patented Jan. 14, 1902.
W. BUSCHMANN.
LIQUID SCALE.
(Application filed Aug. 29, 1901.)
(No Model.)
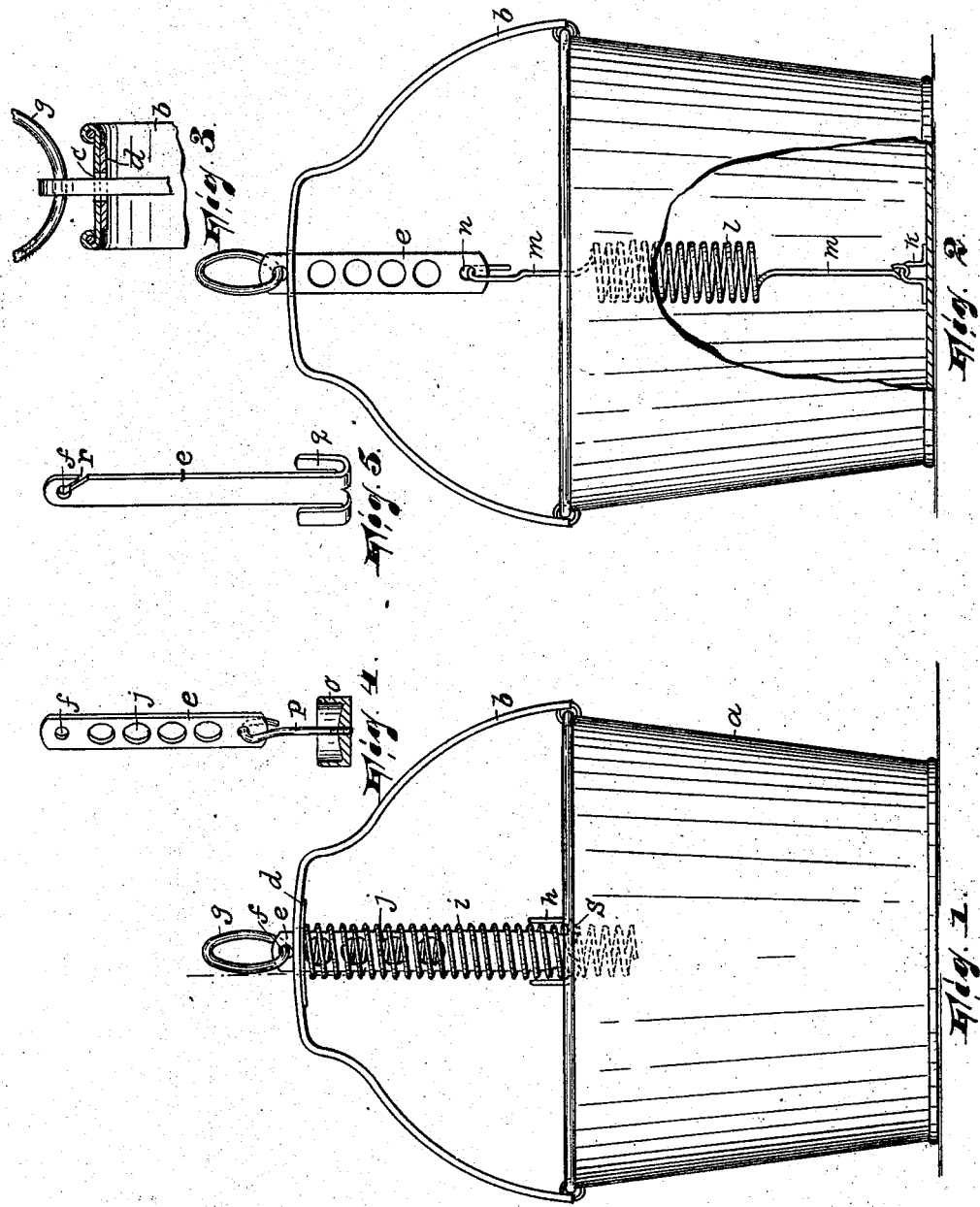
WITNESSES:
Wm D Bell
Robert J Pollitt
INVENTOR,
William Buschmann,
BY
Gartner Steward,
ATTORNEYS.

UNITED STATES PATENT OFFICE.

WILLIAM BUSCHMANN, OF HALEDON, NEW JERSEY.

LIQUID-SCALE.

SPECIFICATION forming part of Letters Patent No. 691,110, dated January 14, 1902.

Application filed August 29, 1901. Serial No. 73,682. (No model.)

*To all whom it may concern:*

Be it known that I, WILLIAM BUSCHMANN, a citizen of the United States, residing in Haledon, in the county of Passaic and State of New Jersey, have invented certain new and useful Improvements in Liquid-Scales; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to liquid-scales, and it constitutes an improvement upon the device patented to myself and C. C. E. Van Alstine by United States Letters Patent No. 437,899, dated October 7, 1890.

The invention will be found fully illustrated in the accompanying drawings, wherein—

Figure 1 is a view of a pail or bucket provided with one form of my improved liquid-scale. Fig. 2 is a view substantially like Fig. 1, but showing another form of the said liquid-scale. Fig. 3 is an enlarged detail view, and Figs. 4 and 5 are detail views illustrating modifications of the invention.

In said drawings, $a$ designates a pail, bucket, or other similar receptacle having a bail or handle $b$, preferably of the flat sheet-metal type. The upper portion of this bail is provided with a central opening $c$. It is reinforced by the plate $d$, which is also penetrated by the said opening $c$.

$e$ (referring to Fig. 1) denotes the index-rod. This rod has an eye $f$ at the upper end which receives its sustaining-ring $g$, and at the lower end of said rod is formed a pair of hooks $h$. In the hooks seats the lower end of a spiral spring $i$, which is coiled about the rod and presses against the under side of the bail $b$.

As indices for the rod $e$ I provide a series of openings $j$. By these or other form of indices the quantity, by weight, of liquid in the receptacle $a$ may be determined according as the one or the other of said openings registers with the bail where the index-rod penetrates it. The openings $j$ of course afford indices for visually determining the quantity of liquid held by the receptacle, but they are provided especially so that the measurement can be taken by feeling the rod with the fingers, as where the receptacle is filled in a darkened cellar or other apartment.

In that form of my invention illustrated in Fig. 2 an eye $k$ is soldered or otherwise secured to the bottom of the receptacle $a$, and the spiral spring $l$ has its ends in the form of hooks $m$ and connected the one to said eye $k$ and the other to an eye $n$ in the lower end of the index-rod $e$.

As a modification of the scale illustrated in Fig. 1 the lower end of the spring $i$ may seat in a cup $o$, carried by a hook $p$, suspended from the index-rod. (See Fig. 4.)

The hooks $h$ of the index-rod illustrated in Fig. 1 are wrought out when the rod is formed. If desired and as illustrated in Fig. 5, the rod, which in this case is preferably made of sheet metal, has its lower end first split and then the split portions $q$ turned in opposite directions to form the hooks.

In order to render the parts detachable, the index-rod may have a saw-cut $r$ communicating with its opening $f$, whereby the ring may be removed preliminarily to separating the other parts.

I form the hooks $h$ or $p$ small enough so that they may enter between the helices of the spring, as at $s$, Fig. 1. Thus if on account of stretching through considerable use, &c., it is necessary to adjust the spring this may be done after one of the hooks has been introduced between two of its helices by simply turning the spring on the index-rod.

Having thus fully described my invention, what I claim as new, and desire to secure by Letters Patent, is—

1. The combination of a pail, bucket or other similar receptacle having a bail, said bail being provided with a central opening, an index-rod penetrating said opening, a spring engaging the lower end of said rod and a portion of the receptacle, and a sustaining device connected to said index-rod above the bail, said index-rod having openings affording tactile indices, substantially as described.

2. The combination of a pail, bucket or other similar receptacle having a bail, said bail being provided with a central opening, an index-rod penetrating said opening, the lower end of said rod being divided and the divided portions turned up to form hooks, and a spiral spring surrounding said index-rod and interposed between said hooks and the bail, substantially as described.

In testimony that I claim the foregoing I have hereunto set my hand this 28th day of August, 1901.

WILLIAM BUSCHMANN.

Witnesses:
JOHN W. STEWARD,
ROBERT J. POLLITT.